(12) United States Patent
Peterson (10) Patent No.: US 12,025,905 B2
(45) Date of Patent: Jul. 2, 2024

(54) CAMERA PLATFORM AND TRACK

(71) Applicant: Per Peterson, Encinitas, CA (US)

(72) Inventor: Per Peterson, Encinitas, CA (US)

( * ) Notice: Subject to any disclaimer, the term of this patent is extended or adjusted under 35 U.S.C. 154(b) by 147 days.

(21) Appl. No.: 17/725,235

(22) Filed: Apr. 20, 2022

(65) Prior Publication Data

US 2022/0342284 A1 Oct. 27, 2022

Related U.S. Application Data (60) Provisional application No. 63/178,122, filed on Apr. 22, 2021.

(51) Int. Cl.
*G03B 17/56* (2021.01)
*E01B 23/02* (2006.01)

(52) U.S. Cl.
CPC ............ *G03B 17/561* (2013.01); *E01B 23/02* (2013.01)

(58) Field of Classification Search
None
See application file for complete search history.

(56) References Cited

U.S. PATENT DOCUMENTS

| | | | |
|---|---|---|---|
| 3,374,974 A | 3/1968 | Furrer | |
| 4,952,953 A | 8/1990 | Ridderstolpe | |
| 4,989,782 A * | 2/1991 | McKie | E01B 23/02 |
| | | | 238/10 R |
| 6,264,330 B1 * | 7/2001 | Walton | F16M 11/08 |
| | | | 104/243 |
| 6,435,421 B1 | 8/2002 | Peterson | |
| 6,557,775 B1 * | 5/2003 | Brinson | E01B 23/04 |
| | | | 238/148 |
| 6,775,475 B1 * | 8/2004 | Traver | G03B 15/00 |
| | | | 396/428 |
| 7,089,867 B2 | 8/2006 | Nilsen | |
| 7,222,466 B2 | 5/2007 | Schipani | |
| 7,295,352 B2 | 11/2007 | Hooper | |
| D622,754 S | 8/2010 | Hernandez | |
| 7,770,810 B2 | 8/2010 | Kennard | |
| 7,854,512 B2 | 12/2010 | Tegland | |
| 7,959,087 B2 | 6/2011 | Willoughby | |
| 8,142,019 B2 | 3/2012 | Hernandez | |
| 8,282,018 B2 | 10/2012 | Kennard | |
| 9,243,371 B2 | 1/2016 | Chapman | |
| 10,124,447 B2 | 11/2018 | Siegmund | |

(Continued)

*Primary Examiner* — Rodney E Fuller
(74) *Attorney, Agent, or Firm* — Averill, Green & Kim; Philip Y Kim; Kenneth L. Green (57) ABSTRACT

A camera platform track provides running surfaces for independent movement of two or more camera platforms, improves strength to weight ratio, improves torsional rigidity, restricts camera platforms from wandering during filming, and improves traction. The camera platform track includes top running surfaces for a first camera platform, and one or more lower running surfaces for additional camera platforms, allowing desired versatility in filming. The camera platform tracks include a box base and an I-beam reaching up from the base to provide strength and torsional rigidity without excessive weight. The running surface lateral spacing may vary from camera platform wheel spacing providing centering to reduce or eliminate wandering, and may include grooves to improve traction. wandering, and may include grooves to improve traction.

19 Claims, 8 Drawing Sheets

(56) References Cited

U.S. PATENT DOCUMENTS

| | | |
|---|---|---|
| 10,435,056 B2 | 10/2019 | Tolles, Sr. |
| 2013/0259463 A1 | 10/2013 | Dybowski |
| 2014/0053751 A1 | 2/2014 | Lostao |
| 2014/0076192 A1* | 3/2014 | Hurd ........................ B61B 9/00 |
| | | 104/165 |

* cited by examiner

CAMERA PLATFORM AND TRACK

CROSS-REFERENCE TO RELATED APPLICATIONS

The present application claims the priority of U.S. Provisional Patent Application Ser. No. 63/178,122 filed Apr. 22, 2021, which application is incorporated in its entirety herein by reference.

BACKGROUND OF THE INVENTION

The present invention relates camera platform tracks and in particular to camera platform tracks used in the motion picture industry.

Known camera platform tracks only support a single camera platform, or two or more camera platforms on the same running surfaces, not allowing independent movement for filming. The cameras may be operated manually propelled by human power, or remotely by motorized devices. Unfortunately, cameras having a wide-angle (or short focal length) lens preferably move faster on a platform than cameras having a long focal length, and independent motion of cameras is required to edit with a non contrasting tempo of the cameras. Shooting single explosions or action sequences, for dramatic effect, generally requires two cameras moving in different directions, one from the right and one from the left, to have an intersecting moment of impact, one wide angle camera and a second with a longer focal length camera for more impact and detail.

Known tracks have smooth running surfaces which do not facilitate efficient operation of friction drive motors for isolated/remote operation and slipping distorts filming and creates undesirable environmental noise.

Known tracks, for example described in U.S. Pat. No. 4,989,782, are a single I-beam structure. The single I-beam is not torsionally ridged and does not always lay straight and may flex introducing undesired motion into video and wheel may wander as the camera platform travels along the track. Motor driven camera platforms press against the I-beam structure and often distort or move the track. A sufficiently strong I-beam track is generally too heavy for easy movement and assembly, and requires a height likely to cause tripping and injury. The '782 patent thus fails to address torsional liabilities and flexing issues which were only discovered by later use of the track.

U.S. Pat. No. 6,435,421 filed by Applicant provides better torsionally rigidity but there is desire to carry more than one camera on a track or pair of tracks, so that the cameras are independently movable not interfering with each other. The track of the '421 patent does not allow two or more independent cameras.

Therefore, there is a need for a track with both torsional rigidity and suitable for two or more cameras operating independently.

BRIEF SUMMARY OF THE INVENTION

The present invention addresses the above and other needs by providing a camera platform track which provides running surfaces for independent movement of two or more camera platforms, improves strength to weight ratio, improves torsional rigidity, restricts camera platforms from wandering during filming, and improves traction. The camera platform track includes top running surfaces for a first camera platform, and one or more lower running surfaces for additional camera platforms, allowing desired versatility in filming. The camera platform tracks include a box base and an I-beam reaching up from the base to provide strength and torsional rigidity without excessive weight. The running surface lateral spacing may vary from camera platform wheel spacing providing centering to reduce or eliminate wandering, and may include grooves to improve traction.

In accordance with one aspect of the invention there is provided a camera platform track carrying two or more independent camera platforms. The camera platform track includes a top running surface and one or more lower running surfaces. The lower running surfaces allow independent motion of a second camera providing one camera with a wide angle lens, and a second camera with a long focal length.

In accordance with another aspect of the invention, there is provided a camera platform track including a box supporting an I-beam. Technicians desire a light weight track for moving and assembling while camera teams desire a stable track which requires torsional rigidity. The box supporting an I-beam improves weight to strength ratio satisfying both desires.

In accordance with yet another aspect of the invention, there is provided a camera platform track with offset top running surfaces spaced apart to prevent wandering. Know tracks include top running surfaces spaced to match the separation of camera platform tires. The offset top running tracks are spaced slightly wider or narrower than the camera platform tires to prevent wandering.

In accordance with still another aspect of the invention, there is provided a camera platform track having grooved top running surfaces. The grooves improve traction of wheel driven camera platforms providing accurate film framing.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Where the terms "about" or "generally" are associated with an element of the invention, it is intended to describe a feature's appearance to the human eye or human perception, and not a precise measurement, or typically within 10 percent of a stated value.

Figure 1:
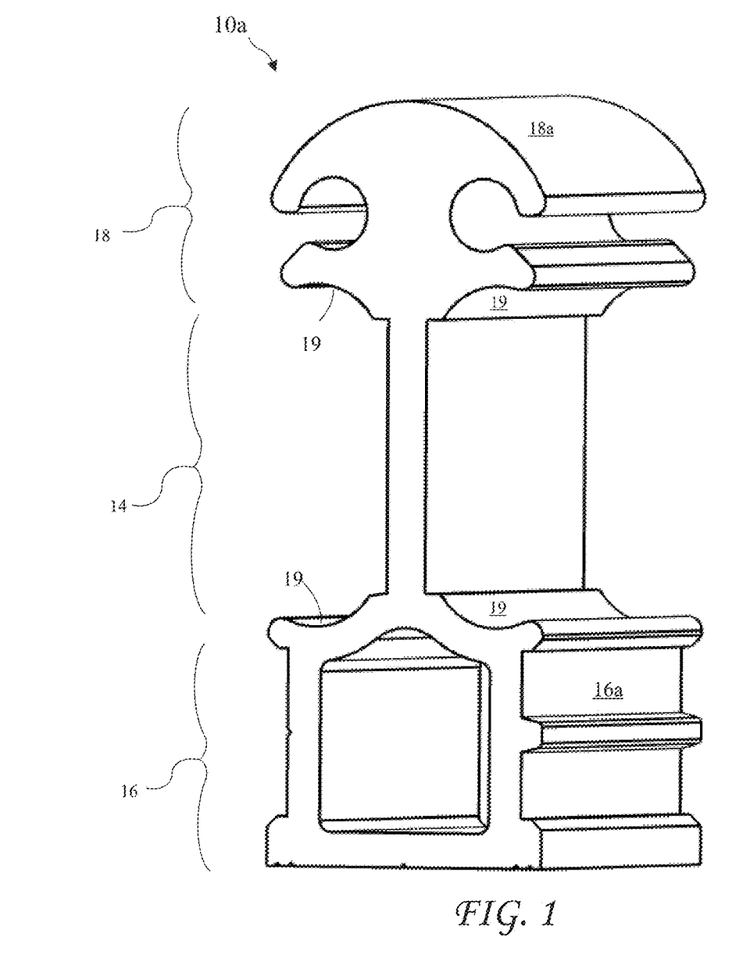
FIG. 1 shows a camera platform track according to the present invention.

A first camera platform track 10a according to the present invention is shown in FIG. 1. The track 10a includes torsion structure 16a (for example a box portion), a vertical I-beam portion 14 above the torsion structure 16a, and a top portion 18 above the I-beam portion 14. A top running surface 18a is formed on the top portion 18 and lower running surfaces 19 are formed on the bottom of the top portion 14 and top of the torsion structure 16a.

Figure 2:
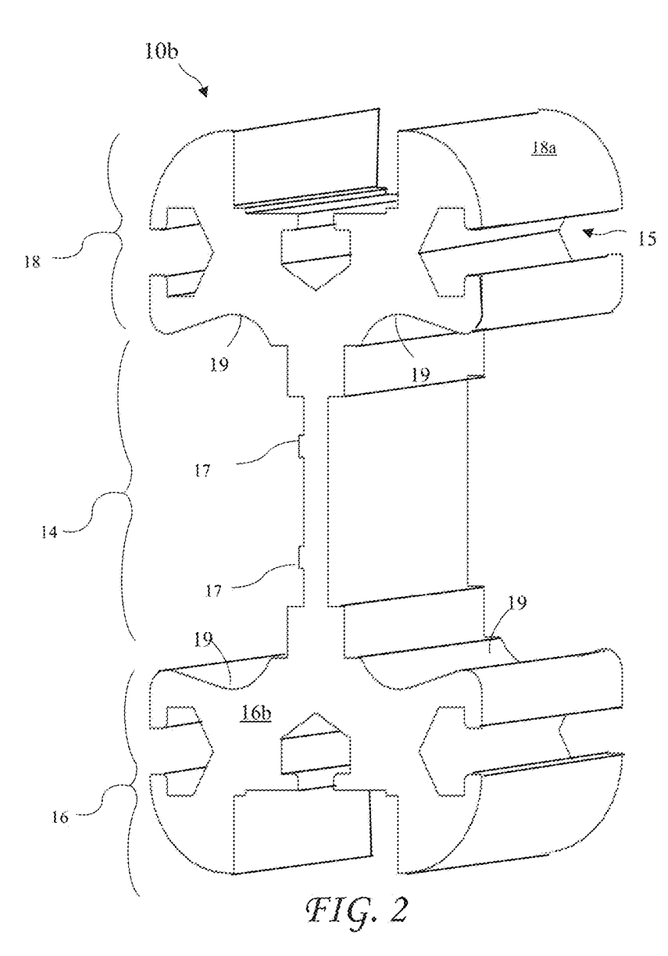
FIG. 2 shows a second camera platform track according to the present invention.

A second camera platform track 10b is shown in FIG. 2. The track 10b includes support attachment features 15, top running surface 18a, lower running surfaces 19, and linear bearing attaching features 17 formed on the I-beam portion 14. A second torsion structure 16b provides torsional rigidity.

Figure 3:
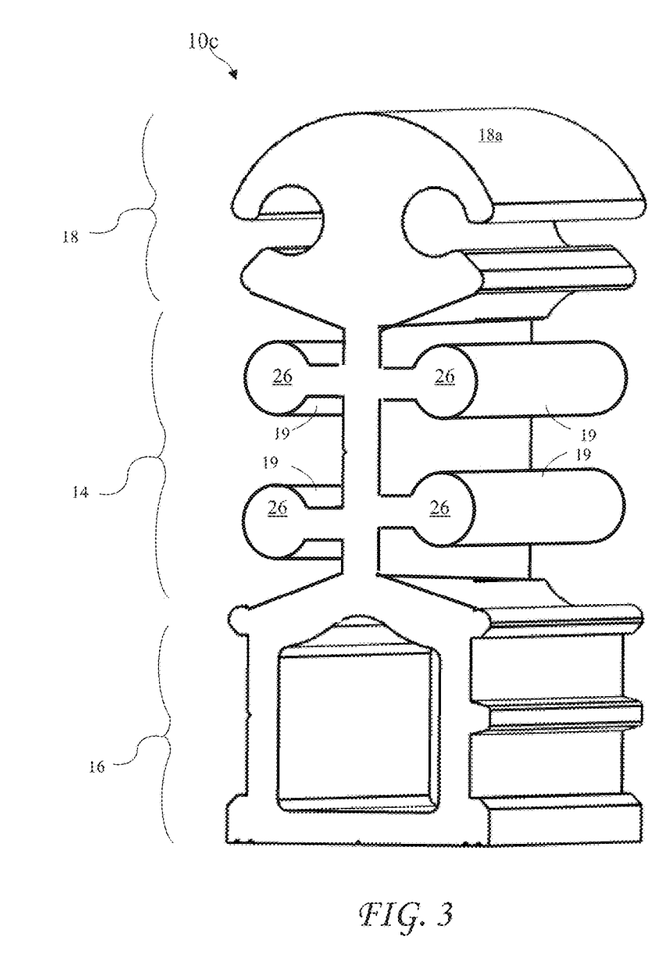
FIG. 3 shows a third camera platform track according to the present invention.

A third camera platform track 10c is shown in FIG. 3. The track 10c includes cooperating pairs of vertically spaced apart cylindrical bodies 26 on both sides of the I-Beam portion 14 providing cooperating lower running surfaces 19. A bi-laterally symmetric track is preferred to facilitate casting, but is not essential.

Figure 4:
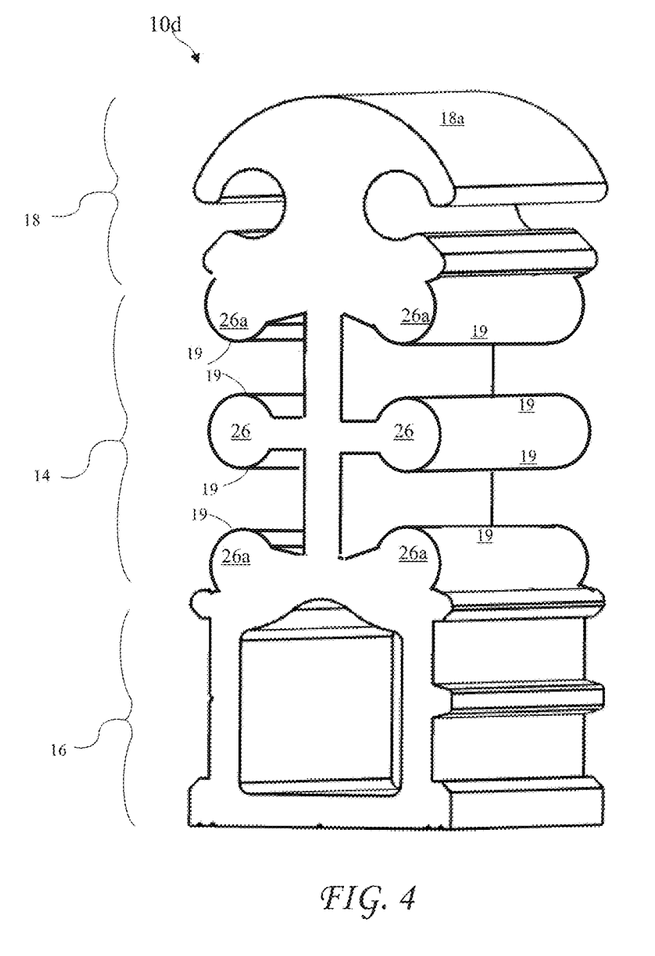
FIG. 4 shows a fourth camera platform track according to the present invention.

A fourth camera platform track 10d is shown in FIG. 4. The track 10d includes cooperating, vertically centered, cylindrical bodies 26 with partial cylindrical portions 26a of the top portion 18 and torsion structure 16a.

Figures 5, 6:
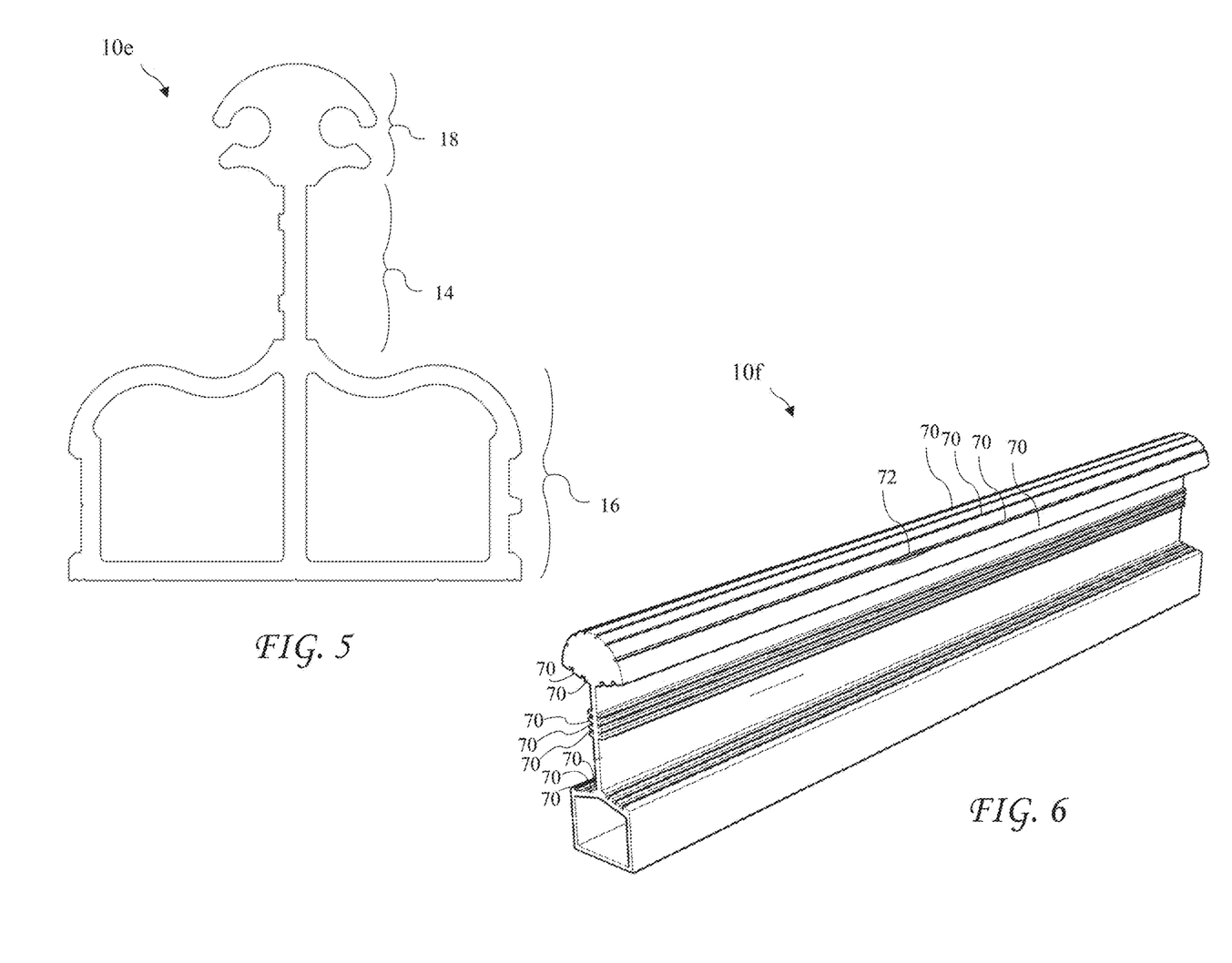
FIG. 5 shows a fifth camera platform track according to the present invention.
FIG. 6 shows a grooved sixth camera platform track according to the present invention.

A fifth camera platform track 10e is shown in FIG. 5. The track 10e is similar to the track 10a, but the torsion portion has a curved top surface.

A sixth camera platform track 10f is shown in FIG. 6. The track 10f is similar to the track 10a, but includes grooves 70 which improve traction of wheel driven camera platforms providing accurate film framing. A lubricant 72 may be spread into the grooves and onto the running surfaces to track noise due to dirt and/or humidity.

Figure 7:
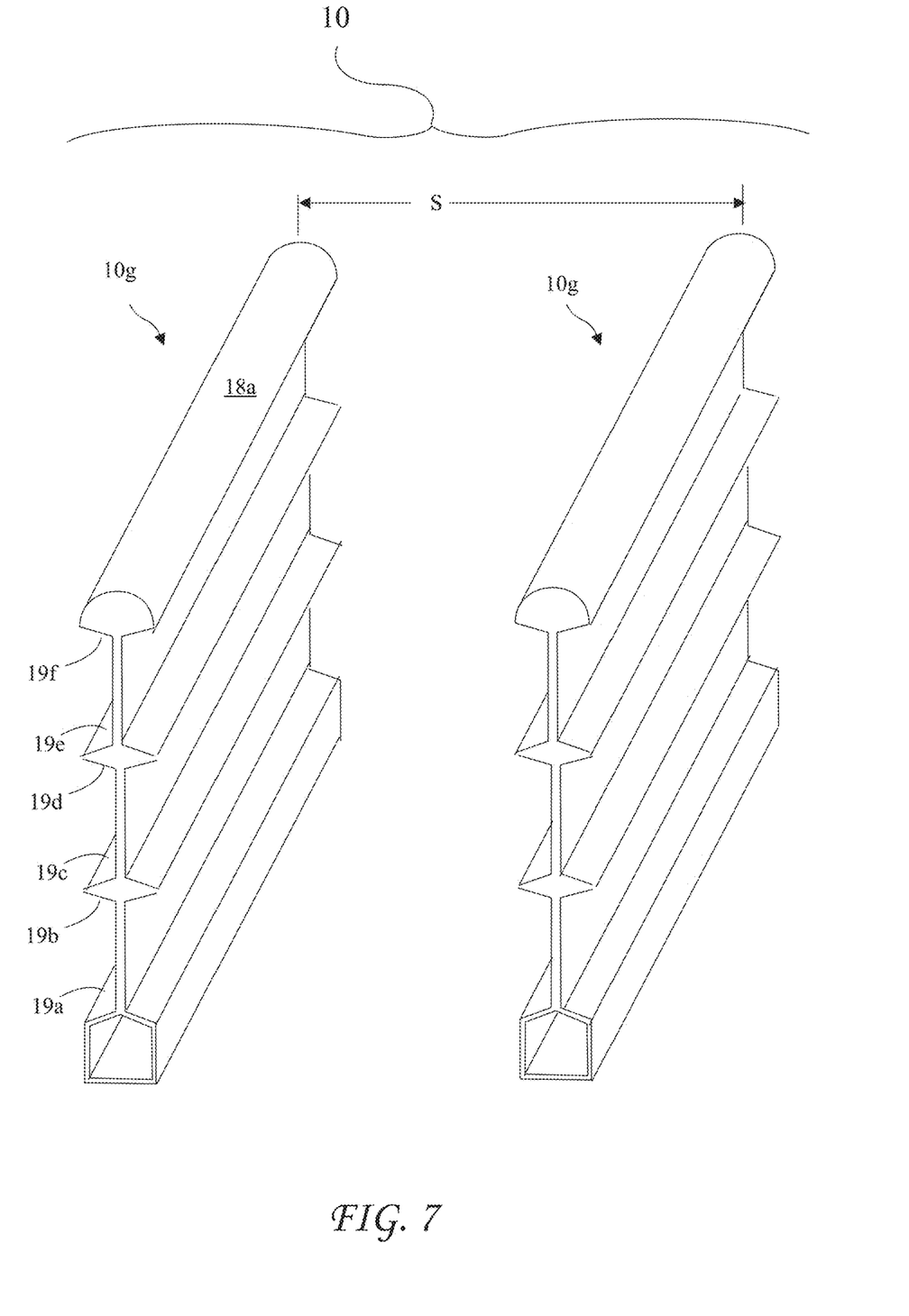
FIG. 7 shows a pair of the camera platform tracks according to the present invention.

A pair of camera platform tracks 10 are shown in FIG. 7. The track 10 include right track 10g and left tracks 10g. Each track 10g includes the I-beam portion 14 supported by the torsion portion 16 (see FIG. 1). Each track 10g includes the top running surfaces 18a. The top running surfaces 18a are preferably rounded having peaks separated by a separation S. The separation S is preferably miss-matched to a wheel 22 (see FIG. 8) separation of a first camera platform 20 (see FIG. 8) to reduce or eliminate wandering of the camera platform 20 on the track 10g, for example, miss-matched by about ⅛ inch, and preferably ⅛ inch wider than the spacing of the wheels.

The camera platform tracks 10g also include at least one lower running surface 19a-19f and preferably at least two cooperating lower running surfaces. The lower running surfaces may include the running surface 19a which is a top surface of the box portion 16 and running surface 19b-19e which are lateral projections from the I-beam portions 14, and running surface 19f on the bottom of the top portion 18.

Figure 8:
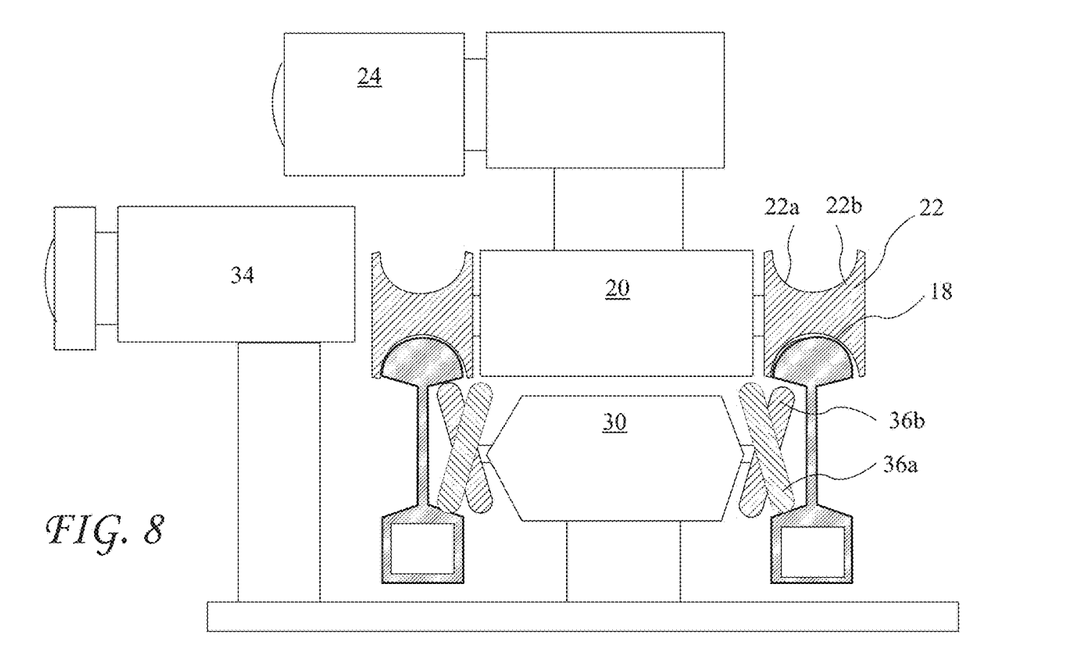
FIG. 8 shows the camera platform tracks with a first camera platform and a second camera platform according to the present invention.
Figure 9:
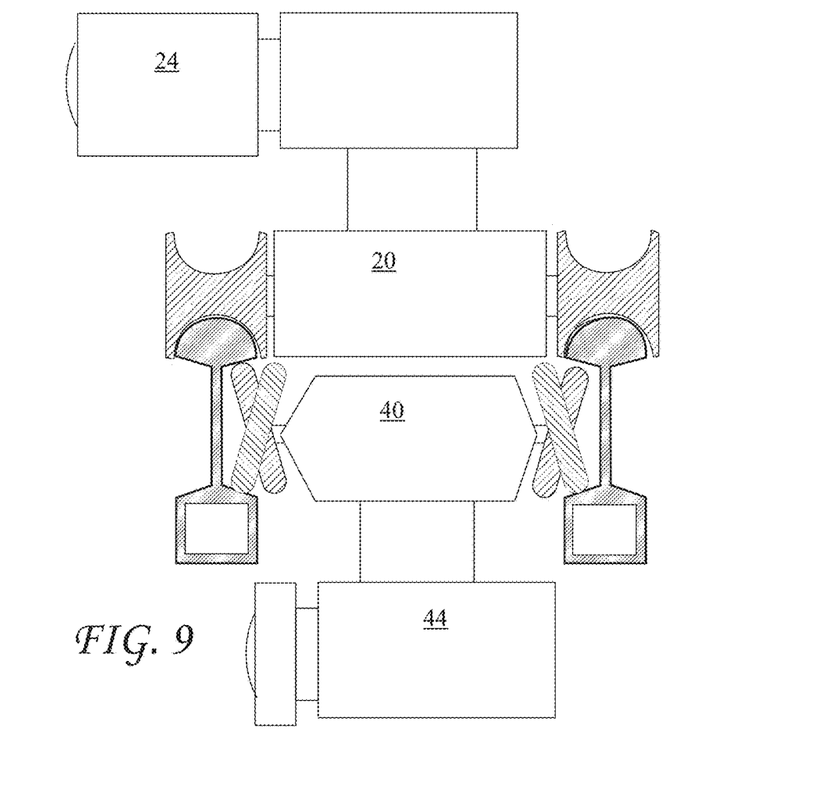
FIG. 9 shows the camera platform tracks with the first camera platform and a third camera platform according to the present invention.

The camera platform tracks 10a (see FIG. 1) with a first camera platform 20 and a second camera platform 30 are shown in FIG. 8. The first camera platform 20 carries a camera 24 and includes wheels 22 riding on the running surfaces 18a. The wheels 22 preferably include including opposing surfaces 22a and 22b contacting the top running surfaces 18a on opposite sides, to capture the wheels 22 on the running surfaces 18a. The opposing surfaces 22a and 22b may be, for example, portions of a concave surface of the wheels 22 as shown in FIG. 8, or may be vertically split wheels (see FIG. 14) or pairs of right and left canted wheels (see FIG. 15).

The second camera platform 30 carries a camera 34 outside the camera platform tracks 10a and includes canted wheels 36a and 36b (see FIG. 11) which ride on inside lower running surfaces 19a-19f. The two cameras 24 and 34 may work in conjunction having the same lens moving in parallel, but may have the ability to change what is known as the "Interocular" or the distance between the center of each lens when shooting 3D.

Figure 10:
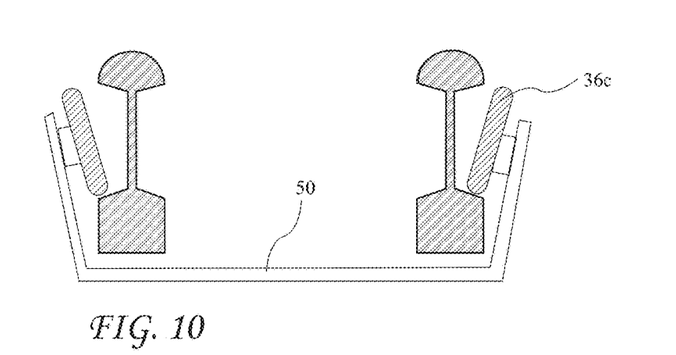
FIG. 10 shows the camera platform tracks with a forth camera platform according to the present invention.

The camera platform tracks 10 with the first camera platform 20 and a third camera platform 50 are shown in FIG. 10. The third camera platform 40 includes a camera 44 and the canted wheels 36a and 36b, but positions the camera 44 under the camera platform tracks 10.

Figure 12:
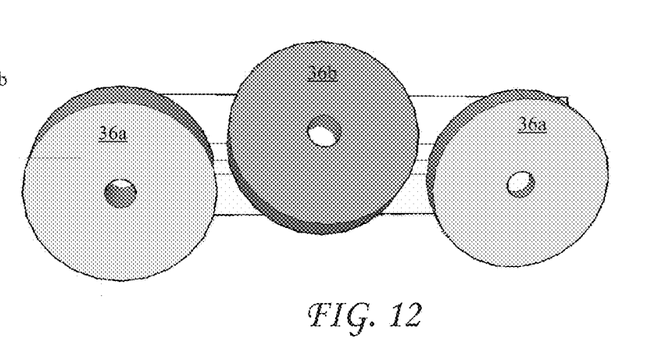
FIG. 12 shows an example of camera platform wheels according to the present invention.

The camera platform tracks 10 with a fourth camera platform 50 carried by canted wheels 36c is shown in FIG. 12. The canted wheels 36c ride on outside running surfaces 19a-19f of the camera platform tracks 10. A camera may be carried as shown for the camera platforms 20, 30, or 40 above.

Figure 11:
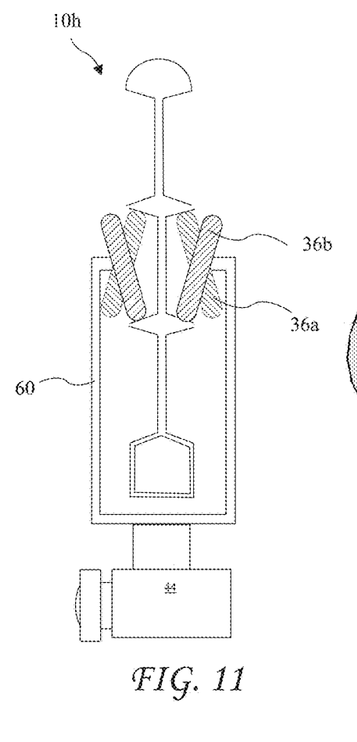
FIG. 11 shows a monorail camera platform track with a fifth camera platform according to the present invention.

A fifth camera platform 60 is shown in FIG. 11 carrying the camera 44. The camera platform 60 may ride on one track 10h providing a mono-track embodiment of the present invention. Wheels 36a and 36b ride between consecutive pairs of lower running surfaces 19 (see FIG. 1). The wheels 36a and 36b rotate independently to avoid binding.

An example of the camera platform wheels 36a and 36b is shown in FIG. 12. The camera platform wheels 36a and 36b rotate independently and for example may engage both running surfaces 19a and 19b (see FIG. 1) allowing the tracks 10 to the tilted or inverted in use. One or more of the camera platform wheels 36a and 36b may be driven to move the camera platforms 30, 30, 40, and 50.

Figure 13:
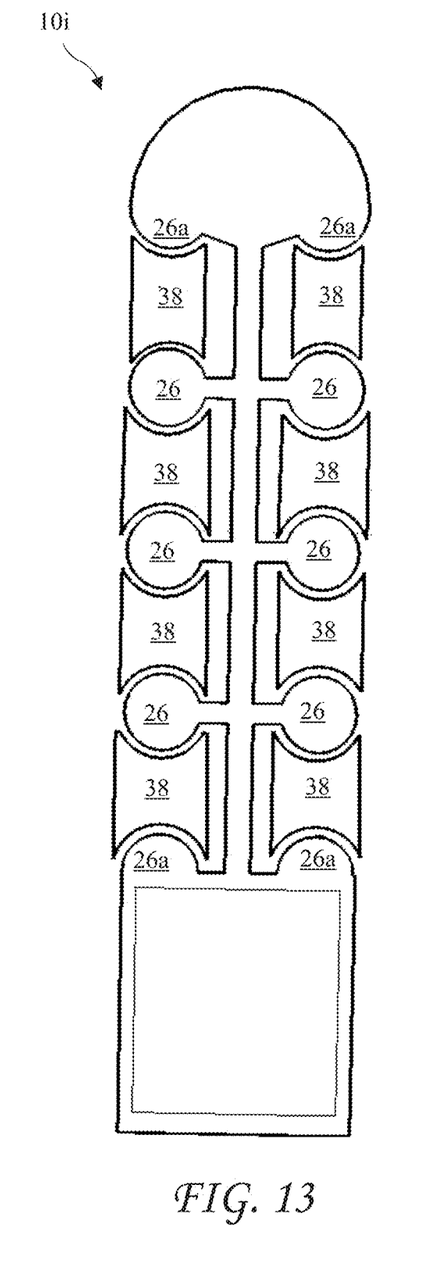
FIG. 13 shows a monorail camera platform track with a multiplicity of wheel positions according to the present invention.

A monorail camera platform track 10i with a multiplicity of wheel positions is shown in FIG. 13. Wheels 38 (see FIG. 14) ride between cylindrical bodies 26 and cylindrical parts 26a.

Figure 14:
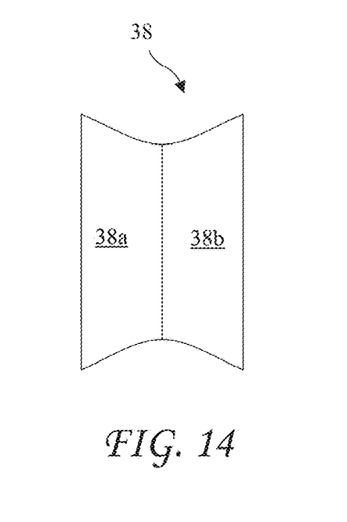
FIG. 14 shows a vertically split wheel according to the present invention.

FIG. 14 shows a vertically split wheel 38 having independently rotating halves 38a and 38b. When the track is curved, the longer outside path may result in artifacts in video. The independently rotating halves 38a and 38b allow the outer wheel to rotate faster to avoid such artifacts.

Figure 15:
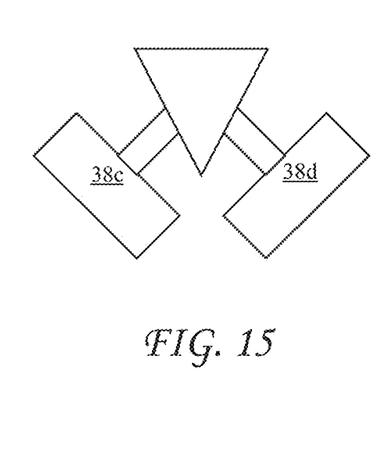
FIG. 15 shows a pair of right and left canted wheels according to the present invention.

FIG. 15 shows a pair of right and left canted wheels 38c and 38d. The independently rotating wheels 38c and 38d allow the outer wheel to rotate faster to avoid such artifacts.

Figure 16:
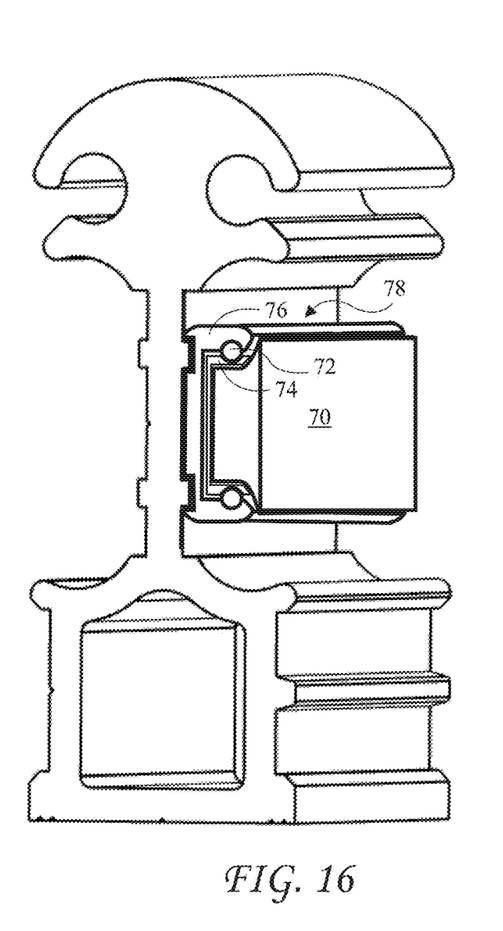
FIG. 16 shows a linear bearing according to the present invention.

FIG. 16 shows a linear bearing assembly 78 including a base 76 attached to the linear bearing attaching features 17 (see FIG. 2). Rods 72 are embedded on interior facing surfaces of the base 76. A sixth camera platform 70 includes a low coefficient material 74 riding between the rods 72. Those skilled in the art will recognize other suitable linear bearing structures and a camera motion system including any linear bearing attached to a track is intended to come within the scope of the present invention.

Figure 17:
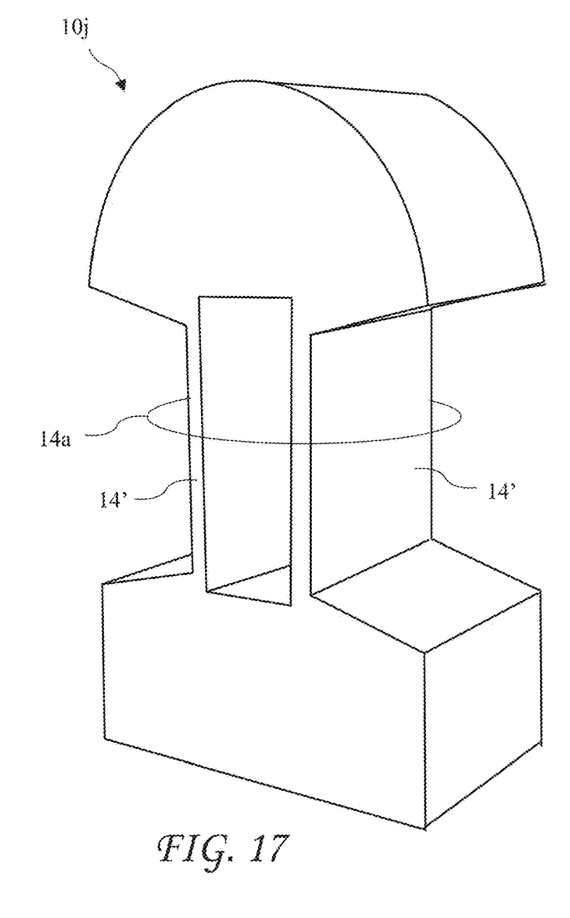
FIG. 17 shows a seventh camera platform track having a hollow I-beam according to the present invention.

A seventh camera platform track 10j having a hollow I-beam 14a is shown in FIG. 17. The hollow I-beam 14a may be two side by side parallel columns 14' and may provide greater strength without adding weight to the track. Any of the tracks 10a-10i may have the hollow I-beam 14a.

While the invention herein disclosed has been described by means of specific embodiments and applications thereof, numerous modifications and variations could be made thereto by those skilled in the art without departing from the scope of the invention set forth in the claims.

I claim:

1. A camera motion system, comprising:
   camera tracks comprising:
      a torsion structure base;
      an I-beam reaching up vertically from the base;
      a top running surface at the top of the I-beam; and
      lower running surfaces between the bases and top running surfaces; and
   at least one camera platform including wheels to ride on the running surfaces,
   wherein the at least one camera platform comprises at least two camera platforms including wheels to ride on the running surfaces, each of the at least two camera platforms able to operate independently.

2. The camera movement system of claim 1, wherein each of the at least two camera platforms is moveable along the track without blocking the field of view the other one of the at least two camera platforms.

3. The camera movement system of claim 1, wherein a cross-section of the box structure has a closed perimeter.

4. The camera movement system of claim 1, wherein the top running surface is a convex top of the I-beam.

5. The camera movement system of claim 1, wherein the top running surface is a convex arc centered on top of the I-beam.

6. The camera movement system of claim 1, wherein:
   the top running surface reside on top of a top portion above the I-beam; and
   the lower running surfaces comprise downward facing bottom surfaces of the top portion and upward facing top surfaces of the torsion structure base.

7. The camera movement system of claim 1, wherein:
   the top running surface reside on top of a top portion above the I-beam; and
   the lower running surfaces comprise:
   downward facing bottom surfaces of the top portion; and
   upward facing top surfaces of horizontally extending cylindrical bodies extended laterally from the I-beam.

8. The camera movement system of claim 1, wherein the lower running surfaces comprise:
   downward facing bottom surfaces of horizontally extending upper cylindrical bodies extended laterally from the I-beam; and
   upward facing top surfaces of horizontally extending lower cylindrical bodies extended laterally from the I-beam.

9. The camera movement system of claim 1, wherein linear bearing attaching features reside on at least one side of the I-beam.

10. The camera movement system of claim 1, wherein the running surfaces are grooved.

11. The camera movement system of claim 1, wherein the lower running surfaces are configured to carry at least two camera platforms.

12. The camera movement system of claim 1, wherein a right and a left camera track are spaced laterally apart to provide the running surfaces.

13. The camera movement system of claim 12, wherein the camera platform includes right and left wheels having concave surfaces for riding on the top running surfaces of the right and left camera tracks.

14. The camera movement system of claim 13, wherein the concave surfaces of the right and left wheels are spaced apart wider or narrower than the top running surfaces of the right and left camera tracks.

15. The camera movement system of claim 14, wherein:
   the camera platform includes right and left sets of three wheels, each set of three wheels riding on opposite sides of a single track;
   each of the right and left sets includes:
      first and third of the three wheels ride a first lower running surface;
      a second of the three wheels rides against a second lower running surface facing the first lower running surface.

16. The camera movement system of claim 13, wherein the wheels are selected from the group consisting of:
   wheels having independent rotating right and left halves to ride on opposite sides of the top running surface; and
   pairs of wheels angled in to ride on opposite sides of the top running surface.

17. A camera motion system, comprising:
   camera tracks comprising:
      a torsion structure base;
      an I-beam reaching up vertically from the base;
      a top running surface at the top of the I-beam; and
      lower running surfaces between the bases and top running surfaces; and
   at least one camera platform including wheels to ride on the running surfaces,
   wherein the torsion structure is a box structure.

18. A camera movement system, comprising:
   right and left camera tracks comprising:
      a box torsion structure base;
      an I-beam reaching up vertically from the base;
      top running surface at the top of the I-beam; and
      lower running surfaces between the bases and top running surfaces; and
   a top camera platform including right and left concave wheels to ride on the top running surfaces of the right and left camera tracks;
   a lower camera platform includes right and left rounded wheels to ride on the lower running surfaces of the right and left camera tracks; and
   the top camera platform and the lower camera platform are moveable along the tracks without blocking the field of view the other one of the at least two camera platforms.

19. A camera motion system, comprising:
   a camera track comprising:

a box torsion structure base;
an I-beam reaching up vertically from the base;
a top portion above the I-beam; and
right and left lower running surfaces on opposite sides to the I-beam between the base and top portion; and
at least one camera platform including wheels to ride on the right and left lower running surfaces.

* * * * *